United States Patent [19]
Nyquist et al.

[11] Patent Number: 5,979,630
[45] Date of Patent: Nov. 9, 1999

[54] ELECTRO-MECHANICAL VARIABLE SPEED CLUTCH

[75] Inventors: Stephen Nyquist, Simsbury; Kevin L. Maurice, Bristol, both of Conn.

[73] Assignee: Inertia Dynamics, Inc

[21] Appl. No.: 08/938,862

[22] Filed: Sep. 26, 1997

[51] Int. Cl.$^6$ .................................................. F16D 19/00
[52] U.S. Cl. ...................... 192/84.91; 192/84 A
[58] Field of Search .................... 192/84.91, 43, 192/51, 70.11; 335/274

[56] References Cited

U.S. PATENT DOCUMENTS

| | | | |
|---|---|---|---|
| 2,936,054 | 5/1960 | Simon et al. | 192/84.91 X |
| 3,329,248 | 7/1967 | Schubert | 192/84.91 X |
| 3,484,816 | 12/1969 | Davidson | 192/84.91 |
| 3,744,609 | 7/1973 | Miller | 192/84 A |
| 4,958,712 | 9/1990 | Suganuma et al. | 192/84.91 X |
| 5,273,409 | 12/1993 | Swain | 192/84.91 X |
| 5,366,419 | 11/1994 | Oda | 192/84.91 X |

*Primary Examiner*—Charles A. Marmor
*Assistant Examiner*—Roger Pang
*Attorney, Agent, or Firm*—Cummings & Lockwood

[57] ABSTRACT

A multiple plate clutch/brake employs a single electromagnet coil to attract an elongate cylindrical armature to compress a series of non-ferromagnetic friction plates alternately joined to one of two independently rotatable shafts. The armature joins one set of friction plates to its shaft for torsional but not axial forces. The compression of the friction plates by the armature transmits torque between the shafts rather than frictional contact by the armature itself. The magnetic path to the armature may pass through two axial gaps to provide a net axial force on the armature. A portion of the magnetic path is provided by one of the shafts.

11 Claims, 3 Drawing Sheets

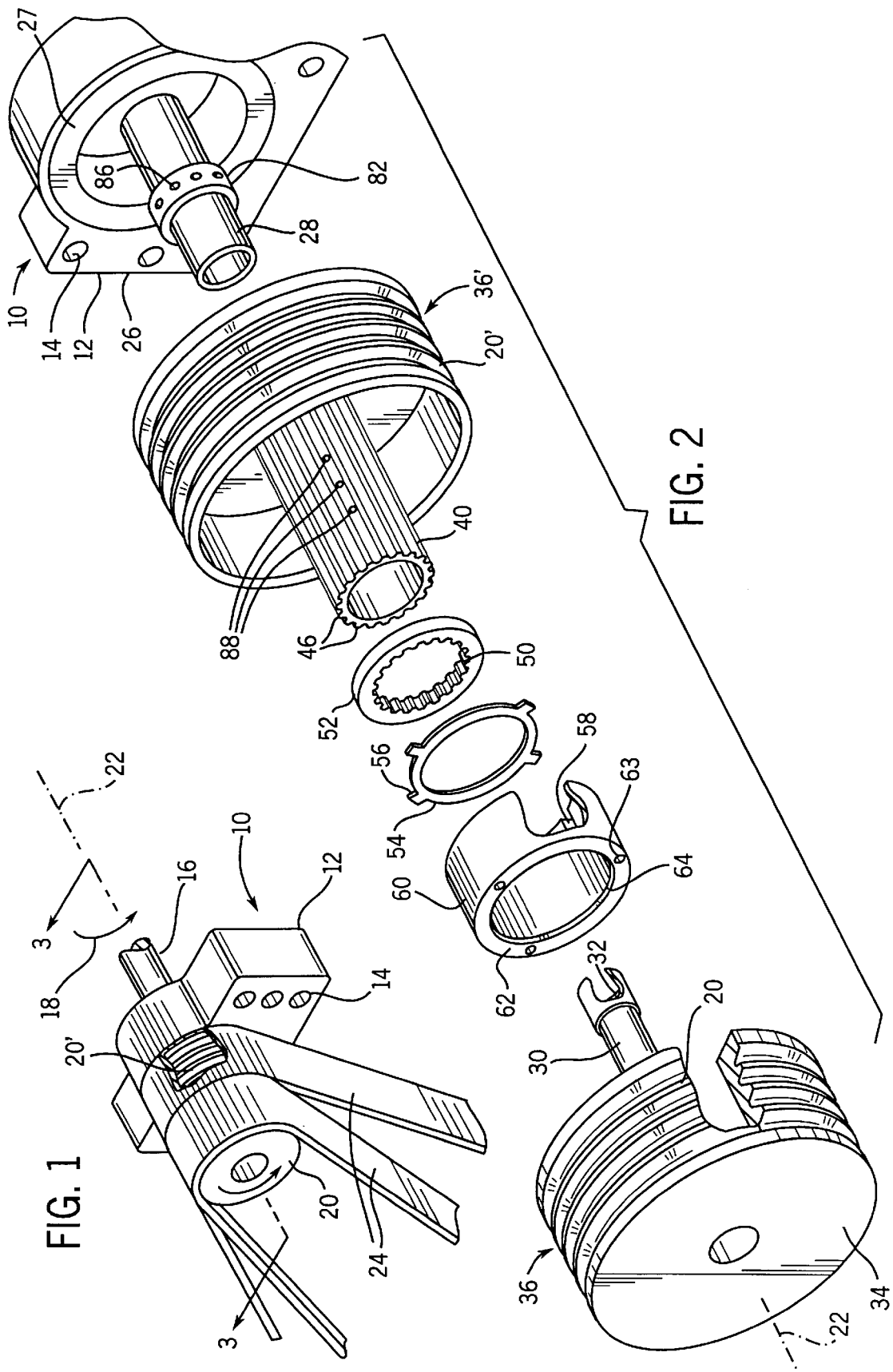

ELECTRO-MECHANICAL VARIABLE SPEED CLUTCH

CROSS-REFERENCE TO RELATED APPLICATIONS

STATEMENT REGARDING FEDERALLY SPONSORED RESEARCH OR DEVELOPMENT

BACKGROUND OF THE INVENTION

Clutches are used to control the transmission of torque between rotatable shafts. Positive clutches, when engaged, lock the shafts together to rotate as one. Frictional clutches permit slipping between the shafts that allows different rotational velocities of the shafts, or when one shaft is locked, for the clutch to be used in a braking capacity.

It is known to produce electrical friction clutches in which a rotor, attached to one shaft, is sandwiched between a stationary electromagnet and an independently rotatable armature attached to a second shaft. Activation of the electromagnet produces a magnetic flux channeled through the material of the rotor and the armature drawing them together in frictional contact.

When high torque capacity is required, a multiple plate clutch may be used in which the two shafts are connected alternately to ones of interleaving disks arranged perpendicularly to the shafts. A compression of the disks together causes a transmission of torque in proportion to the compressing force and the number of disks. Larger numbers of disks permit higher torque transmission with less compressive force.

Typically the disks of a multiple plate clutch are compressed by mechanical or hydraulic means. Electrical activation of a multiple plate friction clutch is hampered by the inability to create a magnetic attraction between multiple plates analogous to the attraction of the armature and rotor in conventional electric friction clutch design.

BRIEF SUMMARY OF THE INVENTION

The present invention provides an electrically-actuated, multiple plate clutch in which a single magnetically permeable armature compresses and provides torque transmission to multiple non-magnetic disks positioned between the armature and the actuating electromagnet. The armature is axially elongate to embrace the multiple plates while providing a small gap between itself and the electromagnet.

Specifically, the present invention provides an electromechanical clutch having a clutch housing supporting a first and second shaft to independently rotate with respect to the clutch housing about a drive axis. An electromagnet coil is attached to the clutch housing and a ferromagnetic armature is attached to the first shaft to rotate with the first shaft and to slide with respect to the electromagnet coil along the drive axis under the influence of the electromagnet coil. A plurality of interleaved first and second friction plates is positioned between the armature and the electromagnet coil to be pressed together by motion of the armature along the drive axis. The first friction plates are attached to rotate with the first shaft and the second friction plates are attached to rotate with the second shaft. A compression of the first and second friction plates communicates torque between the first and second shafts.

Thus, it is one object of the invention to provide an electrically actuated multiple plate clutch to provide high torque and controlled slippage such as may be obtained with such clutch designs. Placing the multiple friction plates between the armature and the coil allows a single attracted armature to evenly compress multiple friction plates.

The electromagnet coil may be positioned co-axially about the drive axis and the armature may include a tubular portion co-axial with the drive axis and having a first and second opposed edges. The first edge is adjacent to the electromagnet coil across a first gap substantially parallel to the drive axis, and the second edge is attached to a lip portion abutting the plurality of interleaved first and second friction plates.

Thus, it is another object of the invention to provide an elongate armature that may embrace a number of friction plates yet provide a narrow air gap with respect to the electromagnet coil.

The friction plates may be constructed of a low magnetic permeability material.

Thus, it is another objection of the invention to prevent the friction plates from causing magnetic "short paths" which would reduce the attractive force between the coil and the armature.

The lip portion may extend perpendicularly to the drive axis to approach a magnetically permeable sleeve communicating with the electromagnet coil across a second gap perpendicular to the drive axis. A magnetic circuit may thereby be formed from the electromagnet coil through the first gap through the armature, through the second gap, through the magnetically permeable sleeve and back to the electromagnet coil. The magnetically permeable sleeve may be a portion of the second shaft.

Thus, it is another object of the invention to provide a practical design for the elongate armature that supports a continuous magnetic circuit about the electromagnet coil and yet that permits a co-axial configuration of the drive shafts.

The armature may include slots in an inner face of the tubular portion, the slots directed along the drive axis. The first friction plates may include outwardly extending tabs received by the slots to permit axial motion of the first plates and rotation of the first plates with rotation of the armature and thus with the first shaft.

Thus, it is another object of the invention to allow the armature to function both to transmit torque to the first friction plates and to provide a magnetic circuit with the electromagnet coil.

The second shaft may support oil dispersion ports rotating with the second shaft and extending radially outward with respect to the drive axis to the plurality of first and second friction plates. Oil introduced into the second shaft is dispersed by centrifugal force across the plurality of first and second friction plates.

Thus, it is another object of the invention to provide a electromechanical clutch design that promotes circulation of cooling oil past the first and second plates when the clutch is operated in a slipping mode.

The foregoing and other objects and advantages of the invention will appear from the following description. In this description, reference is made to the accompanying drawings which form a part hereof and in which there is shown, by way of illustration, a preferred embodiment of the invention. Such embodiment does not necessarily represent the full scope of the invention, however, and reference must be made therefore to the claims for interpreting the scope of the invention.

BRIEF DESCRIPTION OF THE SEVERAL VIEWS OF THE DRAWINGS

FIG. 1 is a perspective view of the electromechanical clutch of the present invention receiving power from a drive shaft and transmitting that power to a first and second sheave pulley having attached belts;

FIG. 2 is an exploded perspective view of the clutch at FIG. 1 with the belts removed showing the first and second sheave pulleys as supported co-axially by a support shaft of the clutch housing and showing representative ones of the friction plates contained within a magnetic armature;

DETAILED DESCRIPTION OF THE INVENTION

Figure 3:
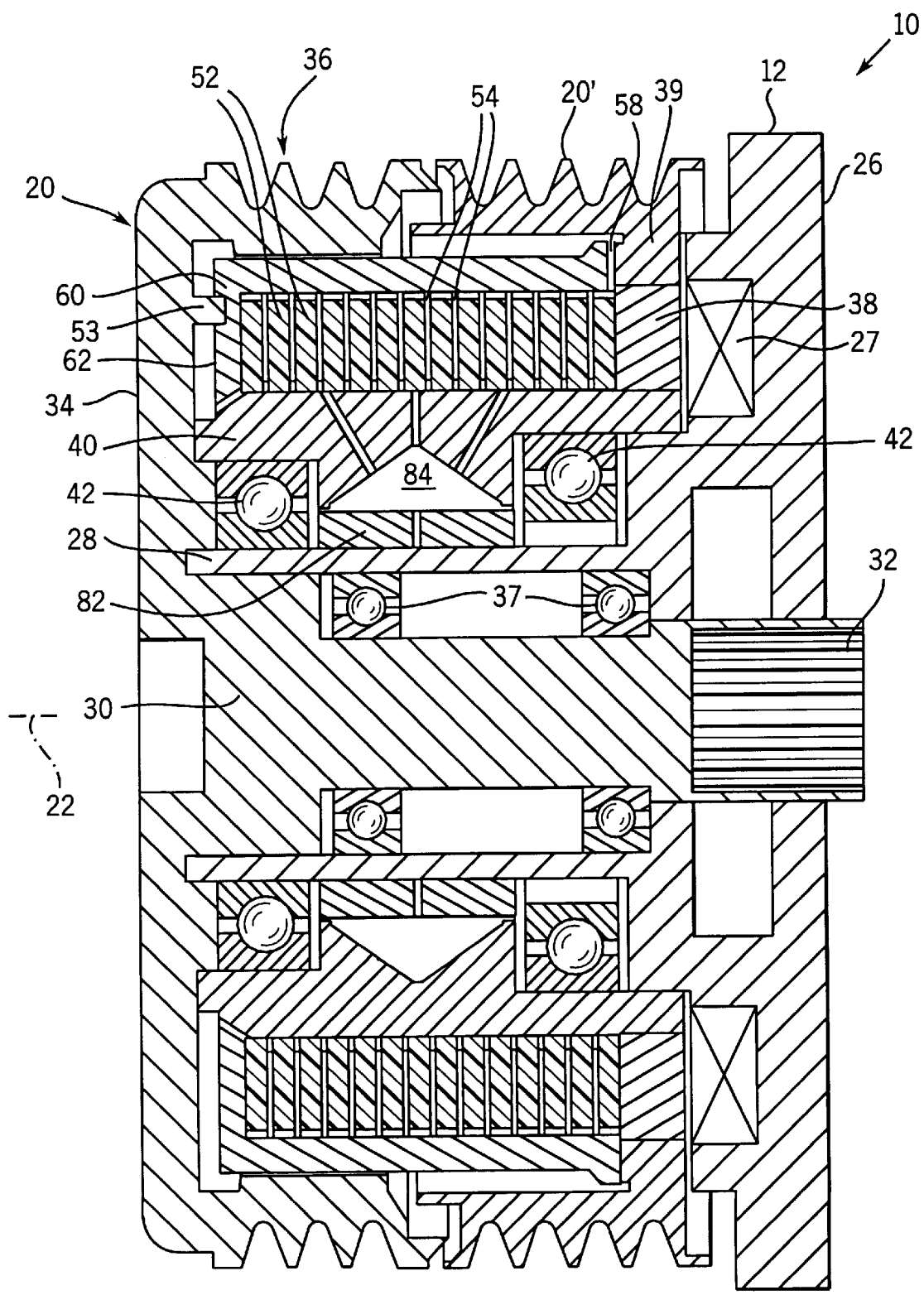
FIG. 3 is a cross-sectional view of the clutch of FIG. 1 taken along line 3—3 showing the assembly of the friction plates within the armature and the co-axial nesting of the sheave pulleys on the support shaft of the clutch housing.

Referring now to FIG. 1, an electromagnet clutch 10 of the present invention includes a ferromagnetic clutch housing 12 having mounting holes 14 to attach the clutch housing to a stationary machine component (not shown).

A drive shaft 16 provides torque 18 that is distributed by operation of the clutch 10 to a first and second sheave pulley 20 and 20'. The sheave pulleys 20 and 20' rotate about a drive axis 22 in common with the shaft 16. As will be described, the front-most sheave pulley 20 is continuously driven by the drive shaft 16 and the rearmost sheave pulley 20' is selectively engaged or disengaged with the drive shaft 16 by operation of the clutch. Alternatively, one of the frontmost sheave pulley 20 or rearmost sheave pulley 20' may be locked to a fixed machine element such as the housing 12 when the clutch is operated as a brake.

The first and second sheave pulleys 20 and 20' support belts 24 on their outer faces. The outer faces have retaining ribs 36 which mesh with corresponding ribs in the drive belt 24 as is understood in the art.

Referring now to FIGS. 2 and 3, the housing 12 provides a generally planar mounting plate 26 perpendicular to the drive axis 22. Affixed to the front of the planar plate 26 and centered about the drive axis is an annular electromagnet coil 27. Current flowing through the coil produces an axial magnetic field actuating the clutch 10 as will be described.

Attached to the front face of the drive plate 26 and extending along the drive axis is a hollow support shaft 28. An inner bore of the hollow support shaft 28 carries a drive axle 30 supported against the inner surface by bearings 37.

A rear end of the drive axle 30, exposed through the rear of the planar plate 26, holds a splined coupling 32 which receives a mating portion of the drive shaft 16 shown in FIG. 1. A front end of the drive axle 30 extends radially outward in a face-plate 34 to connect to a front edge of tubular sheave pulley 20. Drive pulley 20 is a hollow ribbed cylinder which extends rearward from the outer lip of the face-plate 34 to the front edge of the sheave pulley 20'.

The sheave pulley 20', is also a hollow ribbed cylinder and abuts the rear outer edge of pulley 20 on one side and a front face of the plate 26 of the housing 12 on the other edge as to provide, together with pulley 20, an essentially continuous, outer, belt-contacting surface for the clutch 10.

Pulley 20' is supported for rotation about drive axis 22 by a nonferrous spacer ring 38 serving in a manner analogous to the face-plate 34 of pulley 20. In particular, the spacer ring 38 connects the inner edge of pulley 20' (at a radially inward extending flange 39) to a hollow shaft 40 having an inner bore supported against the outer surface of support shaft 28 by bearings 42. A hollow shaft 40 permits pulley 20' to rotate concentrically about drive axis 22. The annular spacer ring 38 magnetically isolates the ferromagnetic flange 39 from the ferromagnetic hollow shaft 40 and may be constructed of a non-ferromagnetic stainless steel.

The outer surface of hollow shaft 40 includes spline teeth 46 which engage corresponding spline teeth 50 on the inner diameter of multiple composite friction plates 52. Each composite friction plate 52 is a flattened ring of non-ferromagnetic material having bonded on its front and rear surfaces a frictional material of a type well known in the art. Seven composite friction plates 52 fit over the spline teeth 46 of the hollow shaft 40 to rotate with the hollow shaft 40 and the pulley 20' while nevertheless being free to move along the drive axis 22.

Interleaved between the composite friction plates 52 are spacer friction plates 54. Spacer friction plates 54 are flattened rings cut from a planar sheet of non-ferromagnetic stainless steel and are sized to contact, at their front and rear faces, adjacent faces of the composite friction plate 52. The inner diameter of the spacer friction plates have no spline teeth 50 but rather are smooth to fit over the spline teeth 46 of the hollow shaft 40 without interference and to provide an air gap between its inner diameter and the hollow shaft 40.

Extending radially outward from the outer periphery of the spacer friction plates 54 are tabs 56. The tabs 56 of the spacer friction plate 54 are received by corresponding channels 58 in the inner surface of a hollow cylindrical armature 60 extending over each of the spacer friction plates 54 when they are interleaved with the composite friction plates 52 on hollow shaft 40.

The front edge of the armature 60 extends radially inward to provide lip 62 terminating in a radially inner edge 64 which abuts the outer edge of the hollow shaft 40. Sockets 63 in the front face of lip 62 engage corresponding bosses 53 extending rearward from the rear face of the face-plate 34 so that armature 60 rotates with pulley 20. The engagement of the channels 58 and tabs 56 cause the spacer friction plates 54 to rotate about drive axis 22 with the armature 60 but to have freedom to move with respect to armature 60 in the direction parallel to the drive axis 22.

Figure 4:
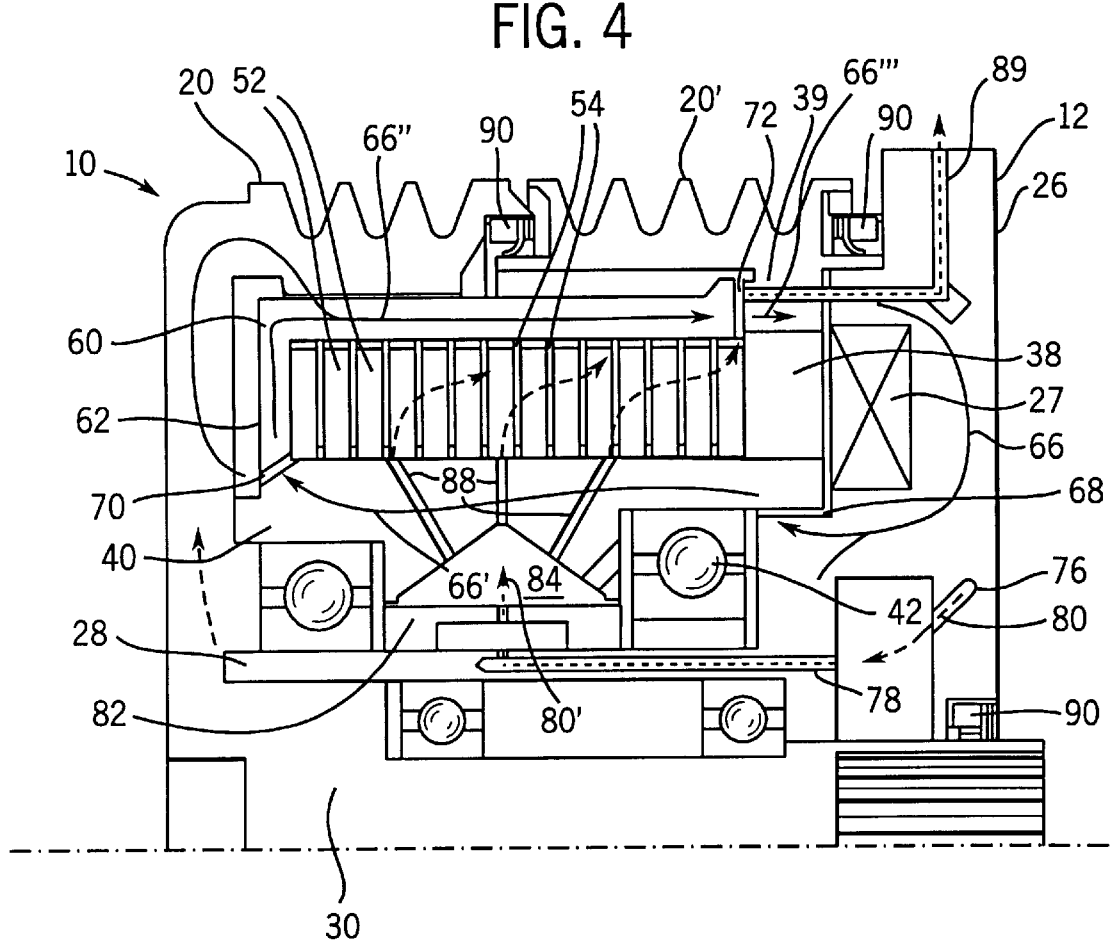
FIG. 4 is a simplified view of the top portion of FIG. 3 showing the magnetic circuit causing the attraction between the armature electromagnet coil and showing the passage of cooling oil through the clutch assembly.
Figure 5:
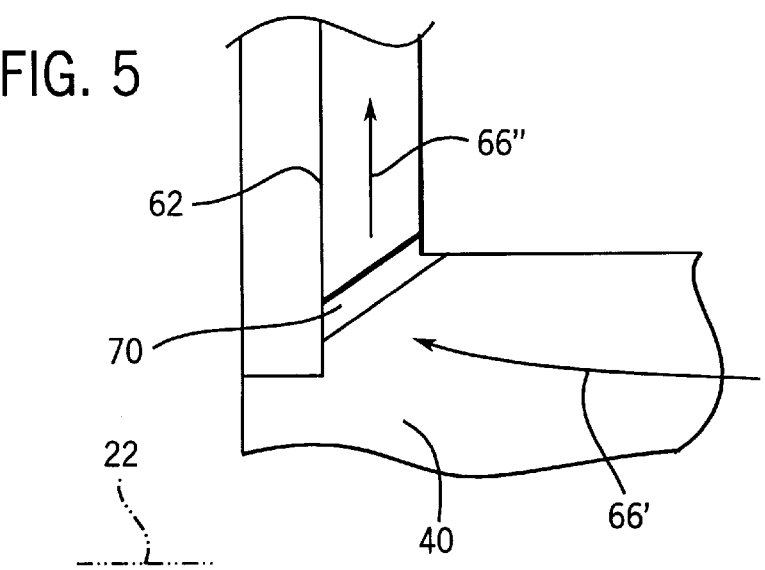
FIG. 5 is a magnified view of the top left portion of FIG. 4 showing the gap which the magnetic flux must jump across.

Referring now momentarily to FIG. 4, current passing through electromagnet coil 27 (into the page) produces a clockwise magnetic field 66 passing in part downward through plate 26 of housing 12 and outward along support shaft 28 until it reaches an inner edge of hollow shaft 40 whereupon it passes through gap 68 between the support shaft 28 and hollow shaft 40 indicated as magnetic field 66'. Because the spacer friction plates 54 and composite friction plates 52 are not ferromagnetic, flux 66' is not drawn through those plates but instead continues along the hollow shaft 40 until it passes across gap 70 between hollow shaft 40 and radially inner edge 64 of armature 60. As depicted in FIG. 5, the gap 70 may be canted to extend with a component perpendicular to the drive axis 22 to provide for an axial attraction of the armature 60. The flux crosses the lip 62 of the armature 60 and turns inward back toward electromagnet coil 27 along the length of armature 60 as magnetic field 66". There the magnetic field crosses gap 72 between the 25 inner edge of armature 60 and the flange 39 of the pulley 20' outside of spacer ring 38 as magnetic field 66'''. The flux then proceeds as shown through the ferromagnetic material of the housing 12 surrounding electromagnet coil 27 to complete the circuit.

The net action of the magnetic field 66 is to draw the armature 60 toward the electromagnet coil 27 along the drive axis 22 compressing the friction plates 52 and 54 together thus transmitting torque from the pulley 20 through the bosses 53 (shown in FIG. 3) to the armature 60 via the sockets 63 into spacer friction plates 54 then frictionally into composite friction plates 52 to the hollow shaft 40 through spacer ring 38 to pulley 20'.

Gaps 68 and 70 are radially symmetric and therefore produce no net force on their respective components. The non-ferromagnetic spacer ring 38 prevents a shorting out of the magnetic flux that would otherwise pass through the armature 60 as described.

Referring now to FIGS. 2, 3 and 4, cooling oil 80 may be introduced through plate 26 via port 76 in that plate 26 and may flow outward through an axial channel 78 in support shaft 28 to a central portion of the support shaft 28 surrounded by a distribution collar 82. Oil distribution collar 82 has a plurality of radially directed holes 86. Oil 80' passes through those holes 86 to be received within a manifold 84 cut in the inner surface of hollow shaft 40 distributing the oil to axially displaced holes 88 in the outer surface of hollow shaft 40 (visible in FIG. 2). During operation of the clutch, and especially during slipping of spacer friction plates 54 with respect to composite friction plates 52, oil exits ports 88 and is distributed across these plates for cooling and lubrication by centrifugal force. The relative rotation between the hollow shaft 40 and spacer friction plates 54 causes the oil to be evenly distributed across these plates.

The oil is then collected by the inner surfaces of the pulleys 20 and 20' and is channeled through holes in flange 39 of pulley 20' to collection port 89 cut in the housing 12. As illustrated in FIG. 4, various elastomeric seals 90 are placed between rotating components to provide a hermetic or oil tight seal for the oil 80. Thus, the clutch 10 provides for cooling and lubricating oil flow.

The above description has been that of a preferred embodiment of the present invention. It will occur to those that practice the art that many modifications may be made without departing from the spirit and scope of the invention. In order to apprise the public of the various embodiments that may fall within the scope of the invention, the following claims are made.

We claim:

1. An electromechanical clutch/brake comprising:
   a clutch housing holding a first and second shaft, the first shaft supported for rotation about a drive axis;
   an electromagnet coil attached to the clutch housing;
   a ferromagnetic armature attached to the first shaft to rotate with the first shaft and to slide with respect to the electromagnetic coil along the drive axis under the influence of the electromagnet coil;
   a plurality of interleaved first and second nonmagnetic friction plates positioned between the armature and the electromagnet coil to be pressed together by motion of the armature along the drive axis, the first friction plates attached to rotate with the first shaft, and the second friction plates attached to a second shaft;
   whereby a compression of the first and second friction plates communicates torque between the first and second shaft;
   wherein the electromagnet coil is positioned co-axially about the drive axis and wherein the armature includes a ferromagnetic sleeve surrounding the friction plates co-axial and second opposed edges, the first edge near the electromagnet coil across a first gap substantially parallel to the drive axis, and the second edge attached to a lip portion abutting the plurality of interleaved first and second friction plates.

2. The electromechanical clutch/brake of claim 1 wherein the second shaft is affixed with respect to the clutch housing to providing braking action when the first and second friction plates are compressed.

3. The electromechanical clutch/brake of claim 1 wherein the second shaft is supported to rotate with respect to the clutch housing to providing clutching action between the first and second shafts when the first and second friction plates are compressed.

4. The electromechanical clutch/brake as claimed in claim 1 wherein the lip portion extends perpendicularly to the drive axis to approach a magnetically permeable second sleeve communicating with the electromagnet coil across a second gap opening along the drive axis;
   wherein a magnetic circuit is formed from the electromagnet coil through the first gap, through the armature through the second gap, through the magnetically permeable second sleeve and back to the electromagnet coil.

5. The electromechanical clutch/brake as claimed in claim 4 wherein the magnetically permeable second sleeve is a portion of the second shaft.

6. The electromechanical clutch/brake as claimed in claim 1 wherein the armature includes slots in an inner face of the ferromagnetic, the slots directed parallel to the drive axis and wherein the first friction plates include outwardly extending tabs received by the slots to permit axial motion of the first friction plates and rotation of the first friction plates with rotation of the armature and thus with the first shaft.

7. The electromechanical clutch/brake as claimed in claim 6 wherein the second shaft includes slots in an outer face, the slots directed parallel to the drive axis and wherein the second friction plates include inwardly extending tabs received by the slots to permit axial motion of the second plates with respect to the second shaft without rotational motion of the second plates with respect to the second shaft.

8. The electromechanical clutch/brake as claimed in claim 4 wherein the first and second shafts are co-axially attached to the housing and wherein the first shaft includes a drive portion extending along the drive axis from a first end of the housing to an opposed, second end of the housing to extend therefrom to support a first wheel co-axially surrounding a portion of the first shaft and wherein the second shaft is supported coaxially around the drive portion and extends radially to a second wheel positioned between the first face of the housing and the first wheel.

9. The electromechanical clutch/brake as claimed in claim 8 wherein the housing includes a tubular support extending along the drive axis from a perpendicular mounting plate; wherein the mounting plate supports the electromagnet coil and wherein the first shaft is supported within the tubular support on bearings between an inner surface of the tubular support and an outer surface of the first shaft, and wherein the second shaft is hollow and supported co-axially outside the tubular support on bearing between the outer surface of the tubular support and the inner surface of the hollow second drive shaft.

10. The electromechanical clutch/brake as claimed in claim 8 wherein the second shaft is attached to the second wheel through a non magnetic spacer ring connecting an outer surface of the second shaft to a radially inward extending flange from the second wheel and wherein the radially inward extending flange is positioned within the first gap between the armature and the electromagnet coil.

11. The electromechanical clutch/brake as claimed in claim 1 wherein the second shaft supports oil dispersion ports extending radially outward with respect to the drive axis to the plurality of first and second friction plates;

whereby oil introduced into the second shaft is dispersed across the plurality of first and second friction plates.

* * * * *